United States Patent

Krum et al.

[11] 4,185,928
[45] Jan. 29, 1980

[54] PRINTER FOR ELECTRIC CODING MACHINES

[75] Inventors: Howard L. Krum, Beverly Hills, Calif.; Rolf A. Thienemann, Chicago, Ill.

[73] Assignee: The United States of America as represented by the Secretary of the Navy, Washington, D.C.

[21] Appl. No.: 568,366

[22] Filed: Dec. 15, 1944

[51] Int. Cl.[2] .............................................. G09C 3/08
[52] U.S. Cl. .................................................... 400/90
[58] Field of Search .................. 197/12, 131, 162, 4, 197/18; 400/90

[56] References Cited

U.S. PATENT DOCUMENTS

| | | | |
|---|---|---|---|
| 418,877 | 7/1934 | Hazelin | 197/4 |
| 431,987 | 7/1890 | McCay | 197/151 |
| 892,891 | 7/1908 | Richards | 197/18 |
| 997,285 | 7/1911 | Gammeter | 197/151 |
| 1,098,545 | 6/1914 | Adams | 178/38 |
| 1,520,089 | 12/1924 | Scherbius | 197/12 |
| 1,887,401 | 11/1932 | Denton et al. | 197/133 T |
| 2,105,731 | 1/1938 | Graves | 197/12 |
| 2,366,914 | 1/1945 | Le Clair et al. | 197/12 |

*Primary Examiner*—Stephen C. Bentley
*Attorney, Agent, or Firm*—John R. Utermohle

EXEMPLARY CLAIM

8. In a cryptographic machine having a keyboard, and coding circuits conditionable for encipher and decipher operation: a printing device, means connecting said device to the keyboard through the coding circuits in one direction for enciphering and in the opposite direction for deciphering, and for connecting said device directly to the keyboard for printing plain text; means to feed to said device a tape upon which characters are to be printed, including a friction drive rotatable shaft, tape feed members driven by the shaft, three toothed wheels fixed on the shaft in abutting relation, a first one of said wheels having a continuous series of teeth, a second wheel adjacent thereto having two only diametrically opposite teeth higher than the teeth on the first wheel, and a third wheel adjacent the second having two equal groups of teeth with spaces equal to one tooth separating the groups and a first tooth in each group adjacent a said high tooth, a pawl slidably mounted to be engageable with any said toothed wheel to prevent rotation of the shaft while so engaged, the pawl being rockably mounted to be disengageable from a tooth of the first and third wheel each time a character is printed to permit rotation of the shaft, means to move the pawl to engage the first wheel for decipher and plain text writing, to engage the third wheel for encipher and to engage the second wheel during non-printing operation of the machine, and means actuated to disengage the pawl each time a character is printed.

13 Claims, 11 Drawing Figures

PRINTER FOR ELECTRIC CODING MACHINES

This invention relates to a printing or recording device for an electric coding machine and more particularly to one connected to be controlled in a haphazard manner, as to the character recorded, by changes in the random circuits of a cryptographic unit.

Among the several objects of this invention are:

To provide a compact, accurate, and reliable printing mechanism for a coding machine;

To devise a printer that may be operated with either alternating or direct current;

To provide a printer that will automatically group the letters in a coded message;

To prevent feeding of the tape upon which the letters are printed during certain operations of the machine when letters are not to be recorded.

The mechanism whereby the foregoing and other not specifically enumerated objects are achieved will be set forth hereinafter, with reference to the accompanying drawings in which.

The printing device which constitutes the subject matter of the present invention is uniquely adapted for use with a coding machine. For example, to enumerate only one such aspect, the tape feed is controlled to insert a space after each group of a certain number of letters (5 in the instance shown), to prevent feeding of the tape when the coding circuits are being reset to predetermined initial positions, and to respond normally to the action of the space bar when writing plain text.

Figure 2:
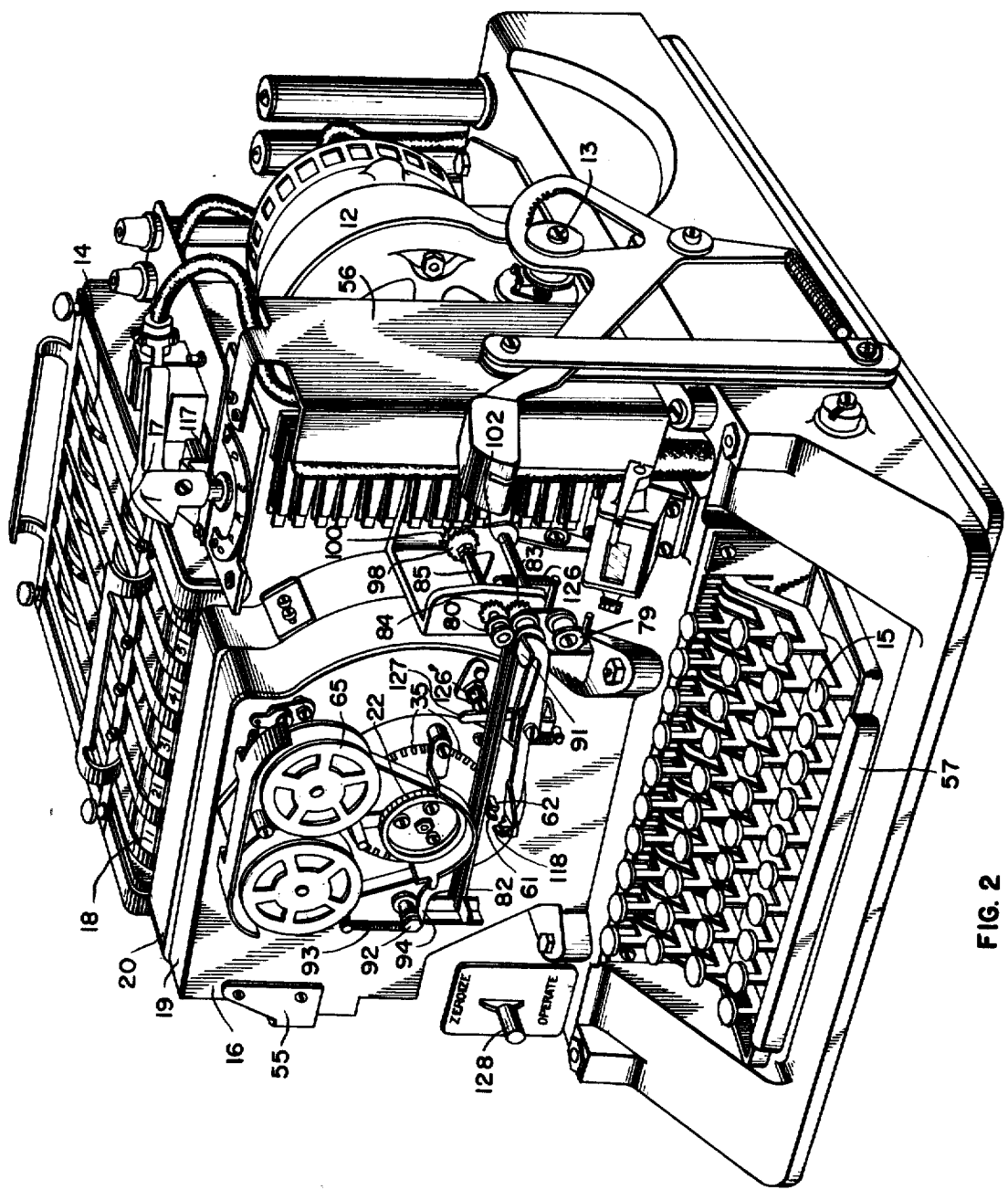
FIG. 2 is a view of the machine in FIG. 1 with the cover removed to disclose other elements of the combination constituting the invention.
Figure 3:
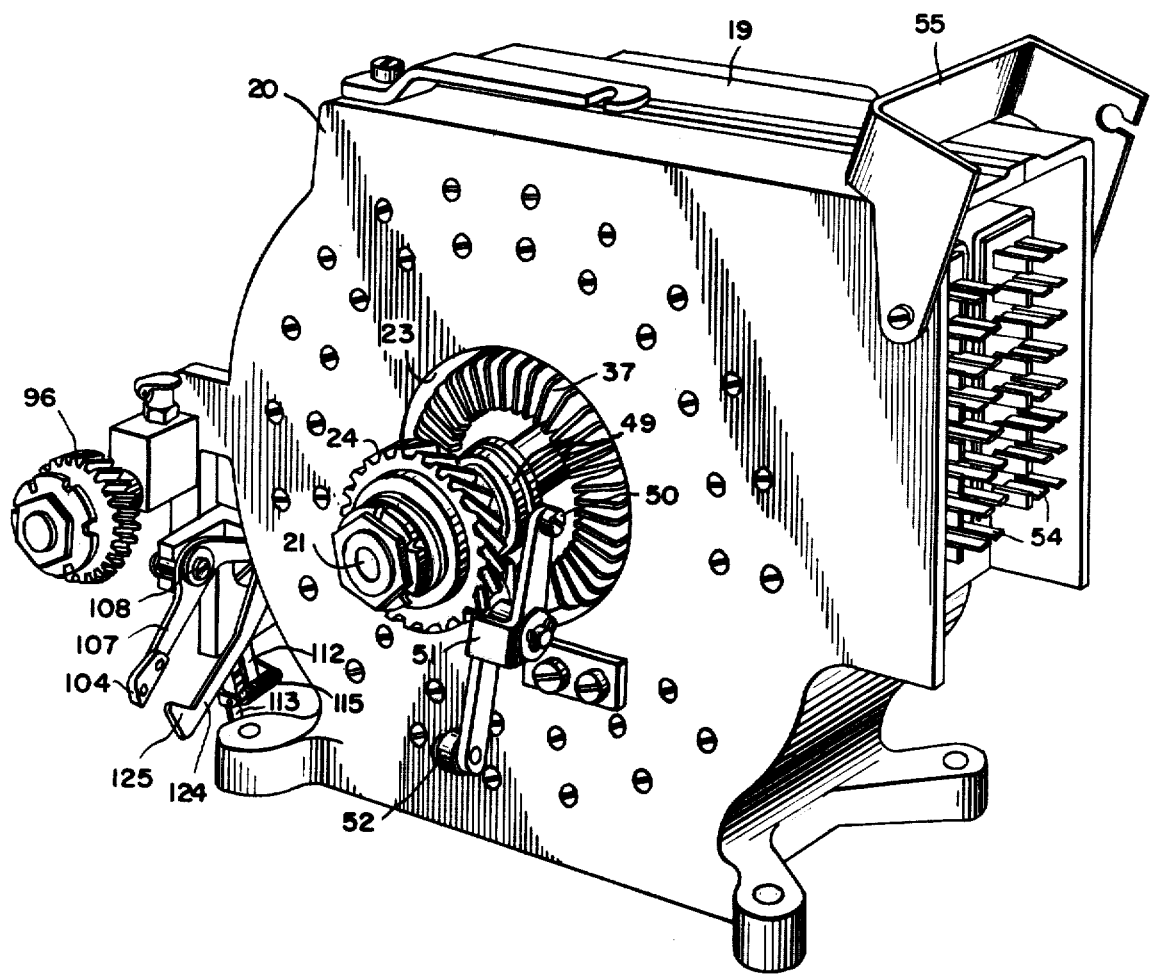
FIG. 3 is a view of the back of the printing unit removed from the machine.

FIG. 2 depicts an electric coding machine embodying the present invention wherein a motor 12 drives a shaft 13 to effect the mechanical operations involved in the functioning of the machine and for controlling certain electrical operations. The coding wheels 14, of a type well known in the art, each carry a plurality of randomly connected conductive elements which are connected into a respective through path to carry electric current from a circuit closing contact controlled by each key 15 of the machine to the printer 16 to record a letter each time a key is depressed. Mechanism is provided to impart unpredictable stepwise rotation to coding wheels 14 in random sequences and groups, as is fully set forth in the application of Krum and Przysiecki, Ser. No. 568,364, filed on the same day as this application. The selection of the coding wheels 14 for stepping is effected by the fortuitous arrangement of conductive paths through the control wheels 17 and index wheels 18, as is described in the application of Safford and Seiler, Ser. No. 568,368, filed Dec. 15, 1944.

Figure 4:
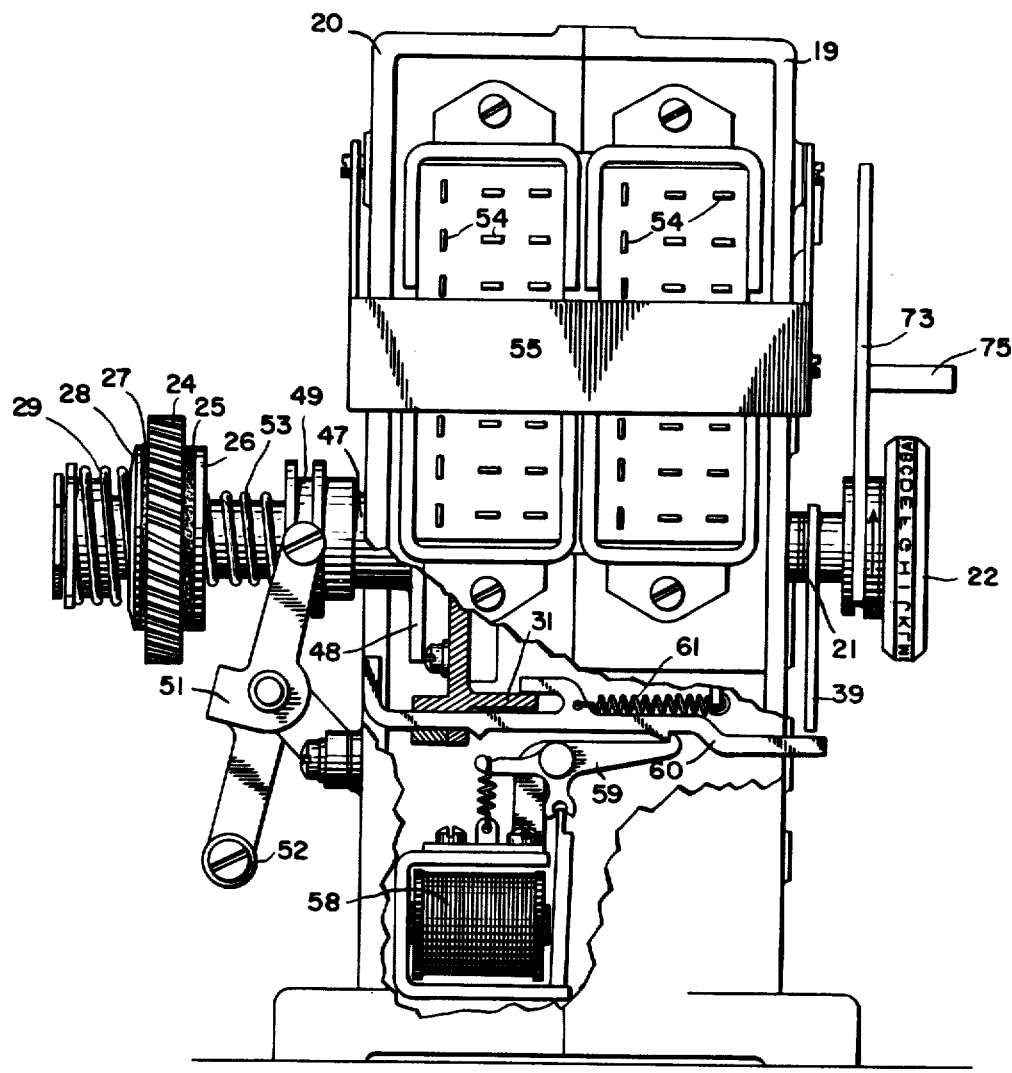
FIG. 4 is an end view of the printing unit as seen from the right in FIG. 3, with parts broken away to reveal certain details.
Figure 5:
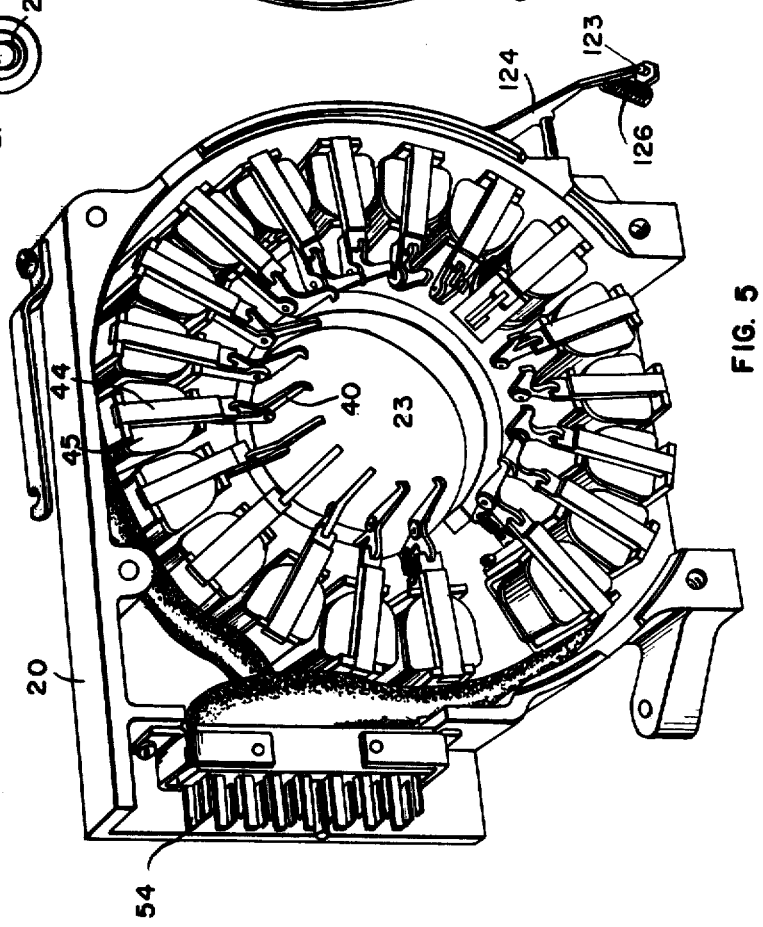

As is clearly shown in FIG. 2, the printer comprises two main sections 19 and 20. The construction and arrangement of the parts in these sections is made clear in FIGS. 5 and 6. The shaft 21 upon which the print wheel 22 is mounted is carried by section 19 and extends through the opening 23 in section 20. Upon the end of shaft 21 remote from printing wheel 22 a driving pinion 24 is rotatably mounted to drive shaft 21 through a friction clutch consisting of a felt washer 25 between the pinion 24 and flange 26 fixed on shaft 21 and a second felt washer 27 between pinion 24 and a disc 28 slidable on shaft 21, the driving friction being derived from the pressure of spring 29 against disc 28 as shown in FIG. 4. This drives shaft 21 to rotate print wheel 22 when the shaft 21 is not restrained, but pinion 24 slips between washers 25 and 27 when the shaft 21 is held against rotation.

Figure 9:
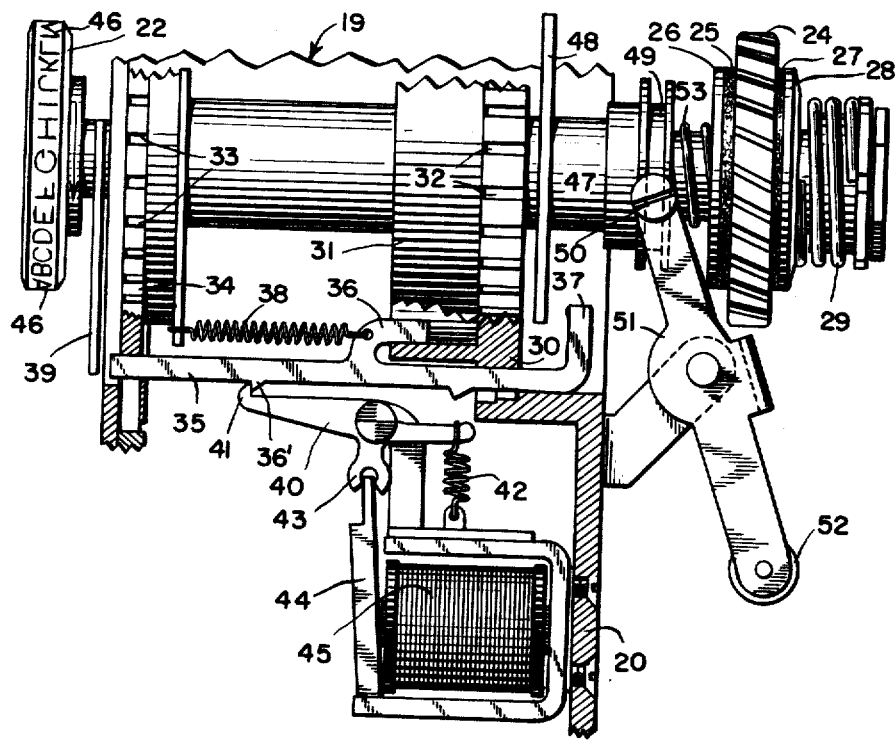
FIG. 9 illustrates a printer stop pin, the magnet for releasing the same, and the means for resetting the pin.

Referring to FIG. 9, it is seen that section 19 includes a radial flange 30 to which is attached an annular laterally extending flange 31, the flange 30 having in it radial slots 32 each of which is axially alined with a respective slot 33 in flange 34. In each pair of axially alined slots 32 and 33 there is slidably mounted a stop pin 35 having a finger 36 that is slidable on the radially inner surface of flange 31, a latch shoulder 36', and an overturned end portion 37. A spring 38 under tension projects pin 35 toward the left in FIG. 9 into the path of stop arm 39 fixed on shaft 21 when pin 35 is free to move, which holds shaft 21 against rotation and causes pinion 24 to slip, thus maintaining the print wheel 22 stationary.

Associated with every alternate pin 35 is a pivoted latch 40 carried by section 20 of the printer 16, having a hooked end 41 that is yieldingly held by a spring 42 in position to engage shoulder 36'. Latch 40 has also a forked arm 43 disposed astride the free end of armature 44 which is pivoted at its other end to be attracted by electromagnet 45 so that when the magnet 45 is energized the latch 40 is disengaged from pin 35 and the pin is projected by action of spring 38. It will be seen that with this connection between latch 40 and armature 44, the moving of pin 35 by spring 38 is effected as soon as the pin is released from latch 40; a mere pulse of current through electromagnet 45 is sufficient to effect movement of pin 35 without the necessity of continued energization of magnet 45. This trigger action permits the use of either alternating or direct current to energize magnet 45. Each of the pins 35 is so disposed that when it is projected print wheel 22 is stopped with a respective character 46 thereon in the printing position.

Reset collar 47, which is slidable on shaft 21, has a flange 48 disposed to engage the ends 37 of pins 35, and a channel 49 in which is a follower 50 carried by one end of pivoted reset lever 51 that has a follower roller 52 at its other end. Pinion 24 is driven by a gear on shaft 13, which shaft makes one complete revolution each time a key 15 is operated. Fixed on shaft 13 is a cam (not shown) that, just before each revolution is completed, acts upon roller 52, rocks the lever 51, and moves collar 48 to the right in FIG. 9 to move any pin 35 that is projected back so its shoulder 36' is engaged by the associated latch 40 and the pin is thus reset, or cocked.

Spring 53 moves collar 47 to the left so the pins 35 are free to be projected.

Figure 6:
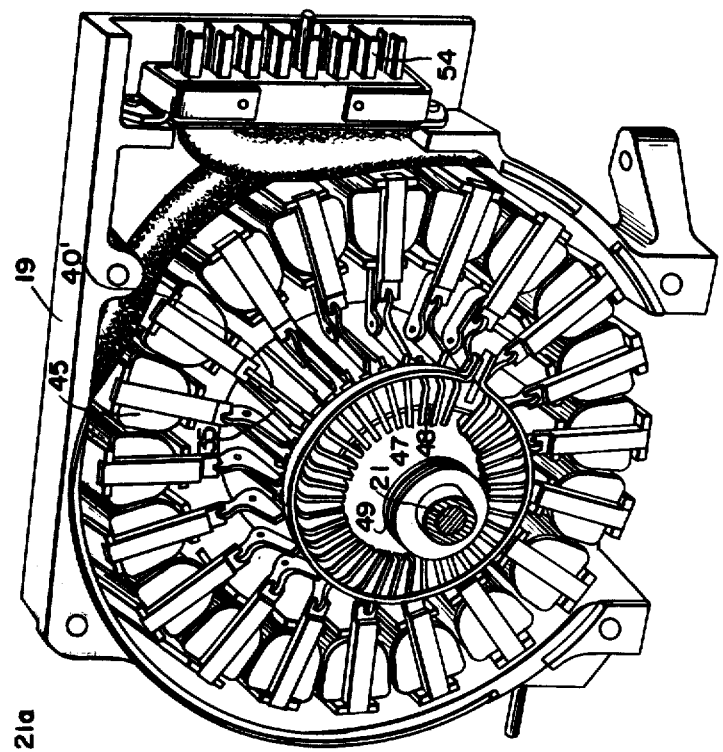
FIGS. 5 and 6 are inside views of the left and right sections, respectively, of the printing unit, with the driving gear omitted from the latter for purpose of clarity.

It has been stated that every alternate pin 35 is associated with a latch 40 and magnet 45 carried by section 20. The other pins 35 are associated with magnets 45 and latches 40' carried by section 19 (FIG. 6). The latches 40', however, have plain square ends to engage the shoulder 36' on the pins 35, instead of hooks 41 as is the case with the latches 40. Conductive prongs 54 enter a suitable multiple receptacle to place the magnets 45 in circuit with wheels 14 and keys 15, the pivoted bail 55 being provided to hold the receptacle in place.

Switch 56 is settable in a plurality of positions to change the circuits through the machine. When set for encoding, the current caused to flow by operation of a key 15 passes through a random path in wheels 14 so that the magnet 45 that is energized thereby is unpredictable. When switch 56 is set for decoding, with all of wheels 14, 17, and 18 in the same relative positions as when encoding, the current from a key bearing a character in the code message will go in the opposite direction over the same path and the letter printed will be the one borne by the key that was depressed when encoding. With switch 56 in a third position, for plain typing, the magnet 45 that is energized will release a stop pin 35 to arrest print wheel 22 to record the same letter as is on the key.

When switch 56 is in the third, or plain, position the operation of the space bar 57 energizes a magnet 58 (FIG. 4) similar to the magnets 45, which releases a latch 59 from print suppress pin 60 and permits spring 61 to project pin 60 to prevent the print hammer described below from striking print wheel 22 and so leaves a blank space. Another similar print suppress pin 62 (FIGS. 1 and 2) is provided to function when wheels 17 are being reset to position to begin a message. The print suppress pins 60 and 62 are offset to clear stop arm 39.

Figure 7:
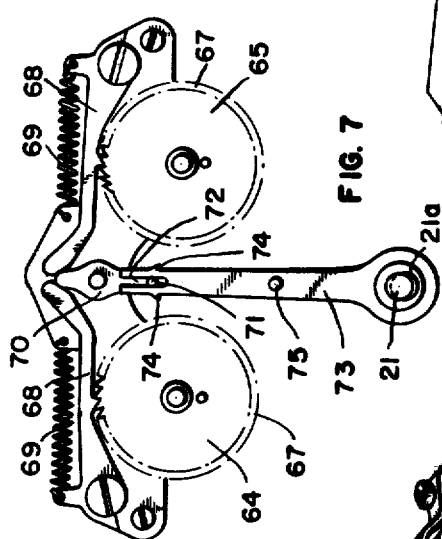
FIGS. 7 and 8 are detailed views of the ink ribbon feeding mechanism.
Figure 8:
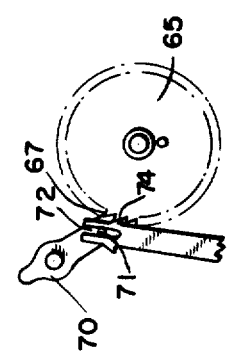

The ink ribbon 63, which is a standard typewriter ribbon, is unwound from one and wound on the other of spools 64 and 65, under ribbon guard plate 66 which has an opening in it opposite the lowermost part of print wheel 22. Under each of spools 64 and 65 (FIG. 7) and having driving engagement therewith is a ratchet wheel 67, the teeth on the two ratchets facing in opposite directions. A feed pawl 68 is yieldingly held in engagement with the teeth of each ratchet 67 by a respective spring 69. Pivoted feed changing arm 70 has an end lying between the free ends of pawls 68 and at its other end a pin 71 lying in a slot 72 in the end of feed lever 73 mounted on an eccentric 21a on shaft 21 and having a tooth 74 on each side to be engageable with the teeth of ratchets 67. Thus, when lever 73 is swung so a tooth 74 engages the teeth of ratchet 67 under spool 65, as shown in FIG. 8, the upper end of feed changing arm 70 is swung over and lifts the pawl 68 from the ratchet of spool 64 and thereafter each rotation of shaft 21 actuates lever 73 to rotate spool 65 through the space of one ratchet tooth and wind the ribbon on spool 65, the spool 64 being free to unwind due to the fact that pawl 68 is disengaged from the teeth of the ratchet 67 associated with the last mentioned spool. A pin 75 is provided to be grasped by the operator to facilitate shifting of feed lever 73 from one spool to the other, there being no provision for doing this automatically as there is on an ordinary typewriter.

Figure 10:
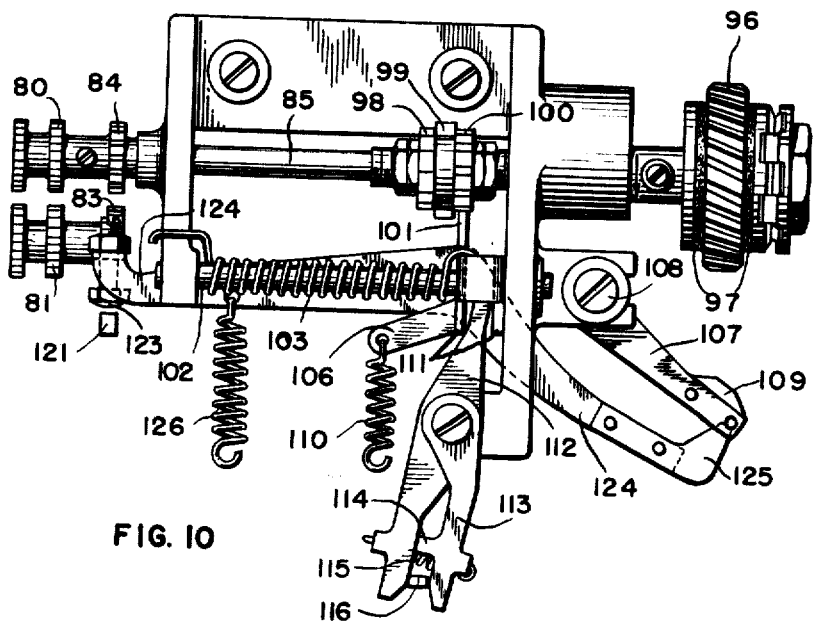
FIG. 10 depicts the means for controlling the tape feed and for operating the print hammer.

The paper tape 76 upon which the message is recorded passes from a roll 77 mounted in a recess in the side of the machine cover, through a guide 78, over idling guide roller 79, between the feed rollers 80 and 81 (FIG. 10) and through a guide 82 into position to be brought against the ink ribbon 63 and the character 46 that is in printing position on print wheel 22. Feed roller 81 is mounted between depending gears on tape guide 82 on the same shaft as gear 83 which meshes with gear 84 on the feed drive shaft 85, (FIG. 10). Gears 83 and 84 have the same number of teeth to rotate feed rollers 80 and 81 at the same identical speed to prevent the application to the tape 76 of any stresses by differential rotation of the feed rollers 80 and 81. U-shaped yoke 86, rockable on stud 87, has an arm 88 pulled down by spring 89 and an arm 90 attached to an ear of tape guide 82, with a tab 91 on the last mentioned shown in FIG. 1 arm. The spring 89 thus holds feed roller 81 against roller 80 to apply sufficient friction to the tape 76 to insure feeding of the tape, and permits separation of the rollers 80 and 81 by pressure on tab 91. The other end of guide 82 is resiliently held against stop 92 by spring 93, lateral movement of the guide 82 at this end being prevented by the arm 94 to which spring 93 is attached being disposed in a slot in guide plate 95 fixed on the housing of the printer.

Figure 11:
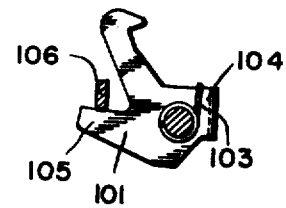
FIG. 11 is a side elevation detailed view of a pawl in the tape feed control mechanism.

Tape feed shaft 85 is driven from a gear on main shaft 13 of the machine through gear 96 mounted between felt friction discs 97. Three different controls on the driving shaft 85 are provided to feed the tape 76 in accordance with different conditions of operation of the machine. Three toothed wheels 98, 99 and 100 having ten teeth, two teeth, and twelve teeth, respectively, are keyed on shaft 85. The purpose of these toothed wheels will be presently explained. A hooked pawl 101 is rockable on shaft 102, one end of spring 103 on shaft 102 being hooked over the arm 104 (FIG. 11) of the pawl under rotative tension to urge pawl 101 into engagement with the teeth of wheels 98, 99, and 100. Spring 103 is longitudinally a loose helix to permit sliding of pawl 101 on the shaft 102.

Overlying tang 105 of pawl 101 is the arm 106 of tape feed lever 107 which is pivoted at 108. Tape feed lever 107 has a follower 109 that rides on a cam on shaft 13 and holds arm 106 upwardly against the pull of spring 110, but at the proper point in the cycle of operation the follower 109 drops into a depression in the cam whereupon spring 110 pulls arm 106 down, disengaging pawl 101 for an instant from the tooth of wheel 98 or 100 with which it is engaged and so permitting gear 96 to drive shaft 85 for the space of one tooth on the wheel to feed the tape 76, the follower 109 riding up on its cam to re-engage pawl 101 with the next tooth and holding shaft 85 against rotation until the pawl is next disengaged.

Disposed between limbs 111 on arm 104 of pawl 101 is one end of a pivoted pawl shift lever 112, with which lever is associated a pivoted keeper 113 having a projection 114 to maintain the keeper spaced from lever 112 but which is yieldingly held against lever 112 by spring 115 under tension. Disposed between the lever 112 and keeper 113 is one end of a lever 116 that is mounted with its other end operatively connected to shaft 117 of switch 56 (FIG. 2) to swing the lever 116 laterally when shaft 117 is turned to condition the circuits of the machine for different types of operation.

When switch 56 is set in the position for encoding, the pawl 101 is engaged with wheel 98. Each time a key 15 is operated and shaft 13 makes a revolution, the pawl 101 is disengaged from the wheel 98 and shaft 85 is permitted to turn to feed tape 76. The teeth on wheel 98 are arranged in two groups of five teeth each with the space corresponding to one tooth left between the two groups at diametrically opposite portions of the wheel 98 and thus when the pawl 101 passes from the last tooth of one group to the first tooth of the other, the tape 76 is fed twice as far as when it moved from one tooth to the other in the same group. Consequently, after each group of five letters is recorded, a space is left so that the encoded message is made up of groups of five letters each. The circuits are so connected for encoding that some letter is printed when space bar 57 is operated and when the switch 56 is set for decoding the connection is changed from space bar 57 to print suppress magnet 58. Therefore, when a letter so printed for a space is struck in decoding, the print suppress pin 60 is projected and a space is left in the decoded message, as will be next described.

Pawl 101 is shifted to wheel 100 when switch 56 is set for either decoding or for plain writing when the machine is used like an ordinary electric typewriter. Since wheel 100 has a continuous series of teeth, twelve in number, the tape 76 is fed one space each time a key 15 is struck or when the space bar 57 is struck in plain writing. Space bar 57 is not used in decoding, due to the fact that some letter is recorded for each space in encoding and, as above stated, when the key bearing the letter substituted for space in the coded message is struck, the print suppress pin 60 is projected and prevents the recording of a letter so that the space is left blank on tape 76.

Provision is made for setting the control wheels 17 to desired initial positions by operation of a key 15 individual to each wheel 17, as set forth in the said application of Safford and Seiler. The setting of all five wheels 17 may involve a considerable number of revolutions of shaft 13 and it is desirable to prevent feeding of tape 76 during this operation. Feeding of tape 76 during resetting of wheels 17 is prevented by coaction of pawl 101 with wheel 99 to which the pawl is moved by lever 116 when switch 56 is adjusted to condition the circuits for positioning the control wheels 17. The wheel 99 has two teeth only, that are so high that pawl 101 cannot be disengaged therefrom by lever 107, and the shaft 85 is held against rotation so that tape 76 is not fed. Each tooth on wheel 99 is adjacent a space between the groups of teeth on wheel 98 so that when pawl 101 is shifted from the former to the latter it will engage the first tooth in a group on the latter to insure that the initial group of letters recorded will contain five letters.

Figure 1:
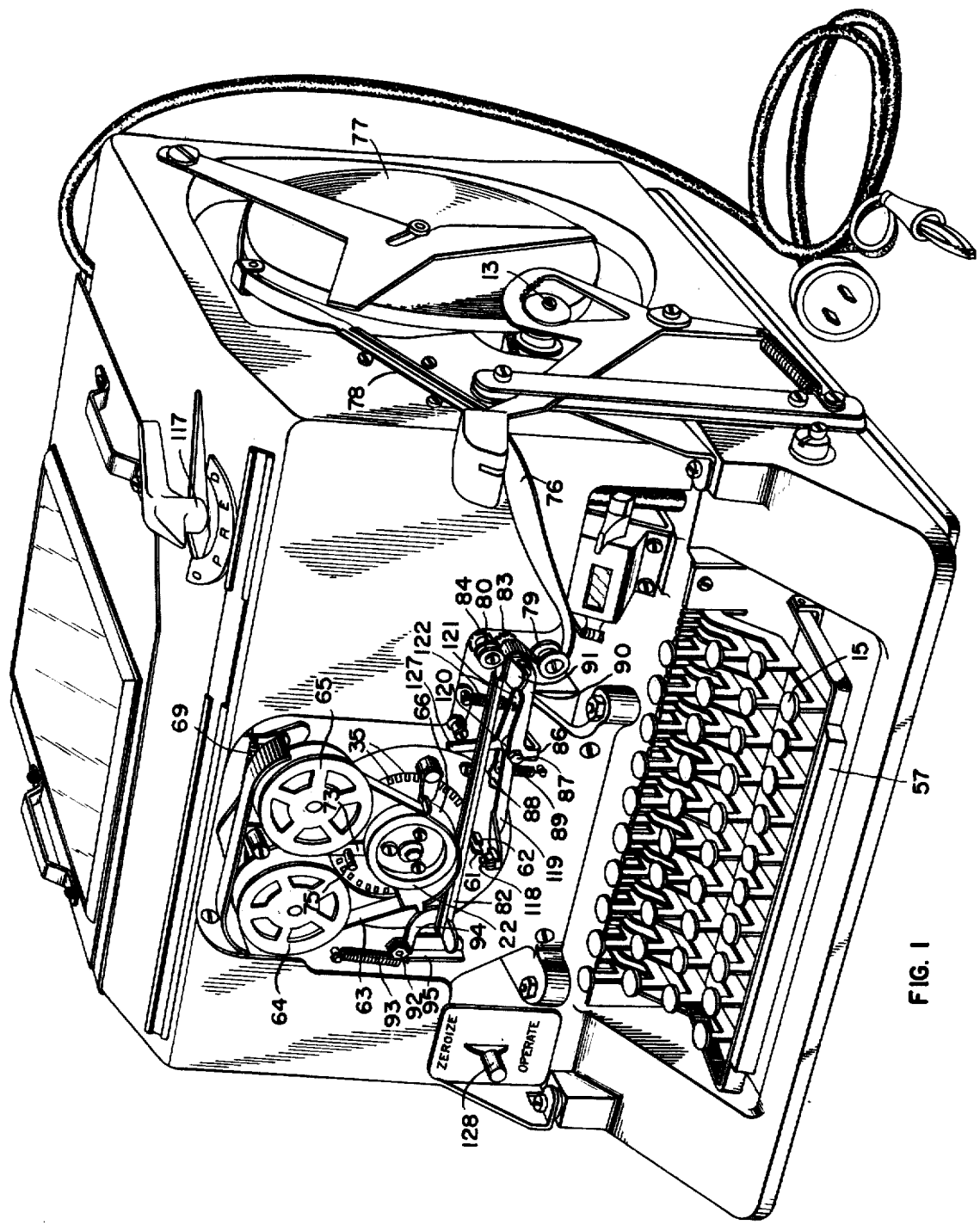
FIG. 1 is a perspective view of a coding machine, showing means for supplying the tape upon which the messages are recorded, the ink ribbon mechanism, and certain parts immediately associated therewith.

The actual recording of each letter is effected by striking tape 76 and ribbon 63 against a character on print wheel 22 that is in printing position, by printing hammer 118, which is mounted on a print hammer lever 119 fixed to one end of hollow shaft 120 to the other end of which is fixed a lever 121 that is drawn upwardly by spring 122 shown in FIG. 1. The free end of lever 121 underlies an adjustable screw 123 (FIG. 10) in one end of print hammer follower lever 124 that is pivoted intermediate its ends and has a follower 125 at its other end to coact with a cam on shaft 13. The end of lever 124 that carries screw 123 is subjected to downward pull by a spring 126, which is held tensioned, and screw 123 is kept away from lever 121 by follower 125 riding on its cam until the proper part in the cycle of operation of shaft 13, when follower 125 drops quickly off its cam and permits spring 26 to pull lever 124 down and strike the lever 121 a sharp blow, which throws print hammer 118 up to strike the tape 76 and ribbon 63 against a character on print wheel 22, unless prevented by the projection of one or the other of print suppress pins 61 and 62. An adjustable eccentrically mounted stop 126' is placed to engage stop arm 127 on lever 121 to prevent deformation of the characters on print wheel 22 due to being struck excessively hard blows by the print hammer 118.

That this invention may be clearly understood, the mode of operation thereof will be described, assuming first that a message is to be encoded. Switch 56 is changed to the plain position so the machine may be used as an ordinary typewriter to write the heading of the message and any key indicia that may be desired. The pawl 101 is engaged with wheel 100 and spacing is effected by depressing space bar 57, which causes the print suppress pin 60 to be projected, the series of teeth on wheel 100 being continuous. In this condition, print wheel 22 is driven, each key 15 is connected directly to a magnet 45 that will release a stop pin 35 to arrest the rotation of print wheel 22 in position to print the letter that is on the key struck, and the mechanism for stepping wheels 14 and 17 is conditioned for non-operation. Each time a key 15 or space bar 57 is actuated the shaft 13 is driven one revolution, so that lever 107 is permitted by its cam to be moved by spring 110 to disengage pawl 101 and allow tape 76 to be fed and likewise the low part of a coacting cam reaches follower 125 so spring 126 can pull down lever 124 and cause screw 123 to strike lever 121 and actuate print hammer 118.

The switch 56 is then turned to the reset position, the switch 128 is moved up to "zeroize" and the keys provided for effecting the reset operation are depressed to bring the wheels 14 and 17 to a predetermined zero position for each wheel. Switch 128 is then changed to "operate" and particular keys 15, specifically numeral keys 1 to 5, are manipulated to bring each control wheel 17 to specified setting. During this time the pawl 101 is engaged with wheel 99 and prevents feeding of tape 76 as above described, while print suppress pin 62 keeps print hammer 118 from striking.

Thereafter switch 56 is put in the encode position which connects keys 15 to magnets 45 in a haphazard manner through the random paths carried by wheels 14 and also makes connections to the circuits through control wheels 17 and index wheels 18 to step the coding wheels 14 in unpredictable sequences and groupings. Thus, any letter on print wheel 22 may be recorded when any alphabet key 15 is depressed. Setting switch 56 in this position moves pawl 101 from a tooth of wheel 99 to the first tooth in a group of teeth on wheel 98 and so the tape will be fed two spaces after each group of five letters, one of which spaces is left vacant between the groups.

When a message is to be decoded, all of wheels 14, 17, and 18 are set at the same initial positions, in the manner above described, as they respectively had when the coding of the message was begun. Putting switch 56 in its decode position connects each key 15 and each magnet 45 to the same path through coding wheels 14 as they were connected to when coding was begun, but in reversed relation, and engages pawl 101 with wheel 100. Thus, when keys 15 bearing the letters in the coded message are struck in the proper sequential order the original message, as it was before encoding, is reproduced.

It will be observed that the organization and functions of the printer 16 are particularly qualified and correlated to cooperate most efficiently and accurately with the cryptographic elements of the machine. For example, the feeding of tape 76 is varied to meet the different requirements of encoding, decoding, and plain writing, and is arrested entirely while the purely mechanical functions of resetting the wheels are effected. Likewise, the operation of print hammer 118 is suppressed in response to the set-up of certain above-specified conditions in the working of the cryptographic features of the device.

We claim:

1. A printing unit operable from a machine having a plurality of keys including character keys, and a drive shaft, comprising a print wheel having in relief on its periphery characters respectively corresponding to characters on said character keys, a shaft on which said wheel is fixed, means on said print wheel shaft constituting a driving connection with said drive shaft to rotate said wheel when unrestrained, a stop arm fixed on said print wheel shaft, an annular series of stop pins projectible into and retractible from the path of said arm, each pin having a shoulder, the ends of said pins remote from said arm being radially inturned, resilient means to urge each pin into projected position, a respective pivoted latch disposed to engage the shoulder on each pin to retain the pin in retracted position, a respective electromagnet connected to be energized upon operation of each said character key having an armature connected to a respective said latch to disengage such latch from the associated pin when energized by even a transitory current to free the pin for projection to stop the print wheel in position to print the character corresponding to that electromagnet, a collar rotatably and slidably mounted on said print wheel shaft having a flange to contact the inturned end of any stop pin in projected position to retract such pin, a pivoted reset lever operatively connected at one end to said collar having a cam follower at its other end, a reset cam on said drive shaft disposed to contact said follower to rock said lever thereby sliding said collar to retract a pin after the character is printed; a pivotally mounted print hammer lever having a hammer at one end disposed to strike the character on the print wheel that is in printing position, a pivoted print hammer follower lever having one end disposed to strike the other end of said print hammer lever, a striker spring connected to urge said follower lever to strike said print hammer lever, a cam on said drive shaft contacting the other end of said follower lever to hold said striker spring tensioned and at one point in the cycle of operation to release said follower lever to free said striker spring to operate; two print suppress pins projectible into the path of said print hammer lever to prevent said print hammer lever from striking when said print suppress pins are projected, a respective electromagnet controlled by a key of said machine to release each of said suppress pins for projection as aforesaid; means to feed a paper tape between said hammer and the character on said print wheel that is in printing position, and means to feed an inked ribbon between said tape and said print wheel.

2. A printing unit operable from a machine having a plurality of character keys and a drive shaft, comprising a print wheel having in relief on its periphery characters corresponding to the characters on said keys, a shaft on which said wheel is fixed, means on said print wheel shaft constituting a driving connection with said drive shaft to rotate said wheel when unrestrained, a stop arm fixed on said print wheel shaft, an annular series of stop pins projectible into and retractible from the path of said arm, each pin having a shoulder, the ends of said pins remote from said arm being radially inturned, resilient means to urge each pin into projected position, a respective pivoted latch disposed to engage the shoulder on each pin to retain the pin in retracted position, a respective electromagnet connected to be energized upon operation of each said key having an armature connected to a respective said latch to disengage such latch from the associated pin when energized by even a transitory current to free the pin for projection to stop the print wheel in position to print the character corresponding to that electromagnet, a collar rotatably and slidably mounted on said print wheel shaft having a flange to contact the inturned end of any stop pin in projected position to retract such pin, a pivoted reset lever operatively connected at one end to said collar and having a cam follower at its other end, a reset cam on said drive shaft disposed to contact said follower to rock said lever thereby sliding said collar to retract a pin after the character is printed; a pivotally mounted print hammer lever having a hammer at one end disposed to strike the character on the print wheel that is in printing position, a pivoted print hammer follower lever having one end disposed to strike the other end of said print hammer lever, a striker spring connected to urge said follower lever to strike said print hammer lever, a cam on said drive shaft contacting the other end of said follower lever to hold said striker spring tensioned and at one point in the cycle of operation to release said follower lever to free said striker spring to operate; means to feed a paper tape between said hammer and the character on said print wheel that is in printing position, and means to feed an inked ribbon in printing relation with said tape and said print wheel.

3. A printing unit operable from a machine having a pluraltiy of character keys and a drive shaft, comprising a print wheel having in relief on its periphery characters corresponding to the characters on said keys, a shaft on which said wheel is fixed, means on said print wheel shaft constituting a driving connection with said drive shaft to rotate said wheel when unrestrained, a stop arm fixed on said print wheel shaft, an annular series of stop pins projectible into and retractible from the path of said arm, each pin having a shoulder, the ends of said pins remote from said arm being radially inturned, resilient means to urge each pin into projected position, a respective pivoted latch disposed to engage the shoulder on each pin to retain the pin in retracted position, a respective electromagnet connected to be energized upon operation of each said key having an armature connected to a respective said latch to disengage such latch from the associated pin when energized by even a transitory current to free the pin for projection to stop the print wheel in position to print the character corresponding to that electromagnet, a collar rotatably and slidably mounted on said print wheel shaft having a flange to contact the inturned end of any stop pin in projected position to retract such pin, a pivoted reset lever operatively connected at one end to said collar and having a cam follower at its other end, a reset cam on said drive shaft disposed to contact said follower to rock said lever thereby sliding said collar to retract a pin after the character is printed; a pivotally mounted print hammer lever having a hammer at one end disposed to strike the character on the print wheel that is in printing position, a pivoted print hammer follower lever having one end disposed to strike the other end of said print hammer lever, a striker spring connected to urge said follower lever to strike said print hammer lever, a cam on said drive shaft contacting the other end of said follower lever to hold said striker spring tensioned and at one point in the cycle of operation to release said follower lever to free said striker spring to operate; means to feed a paper tape between said hammer and the character on said print wheel that is in printing position, and means to feed an inked ribbon in printing relation with said tape and said print wheel.

4. A printing unit operable from a machine having a plurality of character keys and a drive shaft, comprising a print wheel having in relief on its periphery characters respectively corresponding to the characters on said keys, a shaft on which said wheel is fixed, means on said print wheel shaft constituting a driving connection with said drive shaft to rotate said wheel when unrestrained, a stop arm fixed on said print wheel shaft, an annular series of stop pins projectible into and retractible from the path of said arm, each pin having a shoulder, the ends of said pins remote from said arm being radially inturned, resilient means to urge each pin into projected position, a respective pivoted latch disposed to engage the shoulder on each pin to retain the pin in retracted position, a respective means to disengage each latch controlled by a respective said key to release the pin for projection to stop the print wheel in position to print the character corresponding to such pin, means to retract a projected pin after the character is printed; a pivotally mounted print hammer lever having one end disposed to strike the character on the print wheel that is in printing position, a pivoted print hammer follower lever having one end disposed to strike the other end of said print hammer lever, a striker spring connected to urge said follower lever to strike said print hammer lever, a cam on said drive shaft contacting the other end of said follower lever to hold said striker spring tensioned and at one point in the cycle of operation to release said follower lever to free said striker spring to operate; means to feed a paper tape between said hammer and the character on said print wheel that is in printing position, and means to feed an inked ribbon between said tape and said type wheel.

5. A printing unit operable from a machine having a plurality of character keys, and a drive shaft, comprising a print wheel having in relief on its periphery characters respectively corresponding to characters on said keys, a shaft on which said wheel is fixed, means on said print wheel shaft constituting a driving connection with said drive shaft to rotate said wheel when unrestrained, a stop arm fixed on said print wheel shaft, a plurality of devices each corresponding to a respective character on said wheel including an element movable to engage said stop arm to stop said wheel with the corresponding character in printing position, each of said devices being connected to be controlled by a said key, a collar rotatably and slidably mounted on said print wheel shaft having a flange to contact the said elements to condition said devices to free said means for movement, a pivoted reset lever operatively connected at one end to said collar having a cam follower at its other end, a reset cam on said drive shaft disposed to contact said follower to rock said lever thereby sliding said collar to retract a pin after the character is printed; a pivotally mounted print hammer lever having a hammer at one end disposed to strike the character on the print wheel that is in printing position, a pivoted print hammer follower lever having one end disposed to strike the other end of said print hammer lever, a striker spring connected to urge said follower lever to strike said print hammer lever, a cam on said drive shaft contacting the other end of said follower lever to hold said striker spring tensioned and at one point in the cycle of operation to release said follower lever to free said striker spring to operate; means to feed a paper tape between said hammer and the character on said print wheel that is in printing position, and means to feed an inked ribbon between said tape and said print wheel.

6. A printing unit operable from a machine having a plurality of character keys, and a drive shaft, comprising a print wheel having in relief on its periphery characters respectively corresponding to characters on said keys, a shaft on which said wheel is fixed, means on said print wheel shaft constituting a driving connection with said drive shaft to rotate said wheel when unrestrained, a stop arm fixed on said print wheel shaft, a plurality of devices each corresponding to a respective character on said wheel including an element movable to engage said stop arm to stop said wheel with the corresponding character in printing position, each of said devices being connected to be controlled by a said key, means actuated by said drive shaft to move said elements out of position to engage said stop arm after a character is printed; a pivotally mounted print hammer lever having a hammer at one end disposed to strike the character on the print wheel that is in printing position, a pivoted print hammer follower lever having one end disposed to strike the other end of said print hammer lever, a striker spring connected to urge said follower lever to strike said print hammer lever, a cam on said drive shaft contacting the other end of said follower lever to hold said striker spring tensioned and at one point in the cycle of operation to release said follower lever to free said striker spring to operate; means to feed a paper tape between said hammer and the character on said pring wheel that is in printing position, and means to feed an inked ribbon between said tape and said print wheel.

7. A printing unit operable from a machine having a plurality of character keys, and a drive shaft, comprising means having in relief characters respectively corresponding to characters on said keys and mounted to be movable to present any one of said characters in printing position, a driving connection with said drive shaft to move said means when unrestrained, a stop element fixedly connected to said means, a series of stop pins projectible into and retractible from the path of said element, each pin having a shoulder, the ends of said pins remote from said element being overturned, resilient means to urge said pins into projected position, a respective pivoted latch disposed to engage the shoulder on each pin to retain the pin in retracted position, a respective electromagnet connected to be energized upon operation of each key having an armature connected to a respective said latch to disengage such latch from the associated pin when energized by even a transitory current to free the pin to stop said means in position to print the character corresponding to that electromagnet, means including a cam on said drive shaft and mechanism operated thereby to engage the said overturned end of any said pin to retract such pin after the character is printed, means to feed a paper tape in printing relation with the said character in printing position, means to feed an inked ribbon between said tape and said character, and means to strike said tape and said ribbon against the character in printing position.

8. In a cryptographic machine having a keyboard, and coding circuits conditionable for encipher and decipher operation: a printing device, means connecting said device to the keyboard through the coding circuits in one direction for enciphering and in the opposite direction for deciphering, and for connecting said device directly to the keyboard for printing plain text; means to feed to said device a tape upon which characters are to be printed, including a friction drive rotatable shaft, tape feed members driven by the shaft, three toothed wheels fixed on the shaft in abutting relation, a first one of said wheels having a continuous series of teeth, a second wheel adjacent thereto having two only diametrically opposite teeth higher than the teeth on the first wheel, and a third wheel adjacent the second having two equal groups of teeth with spaces equal to one tooth separating the groups and a first tooth in each group adjacent a said high tooth, a pawl slidably mounted to be engageable with any said toothed wheel to prevent rotation of the shaft while so engaged, the pawl being rockably mounted to be disengageable from a tooth of the first or the third wheel each time a character is printed to permit rotation of the shaft, means to move the pawl to engage the first wheel for decipher and plain text writing, to engage the third wheel for encipher and to engage the second wheel during non-printing operation of the machine, and means actuated to disengage the pawl each time a character is printed.

9. In a cryptographic machine having a plurality of character keys, a respective circuit closing device operable by each said key, and a plurality of unpredictably random electric current paths each of which is haphazardly connectible to a respective said circuit closing device: a plurality of electromagnets each fortuitously connectible to an individual said path, a stop pin associated with each said magnet, a spring connected to each said pin tending to move said pin into operative position, means to latch each pin in inoperative position, said latching means being operated by transient energization of the electromagnet to release the pin for movement into operative position; a rotatable shaft, friction means to drive said shaft when free to rotate but to slip when the shaft is held, a print wheel fixed on said shaft and having in relief on its periphery characters corresponding to the characters on said keys, a stop arm fixed on said shaft to engage any said stop pin that is in operative position to hold in printing position a character corresponding to such pin, means to feed a paper tape adjacent a said character that is in printing position, an ink ribbon and means to feed said ribbon adjacent a character in printing position, impact means actuatable to strike said tape and ribbon against the character in printing position, means to actuate said impact means each time a said key is operated, and means to move such pin back to inoperative position after the character is printed.

10. In a cryptographic machine having a plurality of character keys, and cryptographic mechanism that includes haphazardly variable electric current paths connected to be individually supplied with current by operation of said keys: printing means responsive to currents through said paths; means settable to send current through said paths in one direction for coding, in the opposite direction for decoding, or to shunt out said paths while restoring said cryptographic mechanism to an initial adjustment, means to feed a paper tape to said printing means, including a rotatable shaft, a first wheel on said shaft having teeth continuously around its periphery, a second wheel having two diametrically opposite teeth, and a third wheel having two equal groups of teeth with a space between said groups corresponding to each tooth on said second wheel, a rockable pawl slidably mounted to be moved to engage the teeth of any one of said wheels, means operatively connecting said pawl to said settable means to engage said pawl with said third wheel in the coding setting, with said first wheel in the decoding setting and with said second wheel in the setting to restore initial adjustment, and means actuated to disengage said pawl to permit said shaft to rotate to feed said tape after each time said printing means is operated.

11. In a cryptographic machine having a plurality of character keys and a circuit closing device operable by each key: printing mechanism comprising a rotatable shaft, means to drive said shaft including a friction clutch to drive said shaft when the shaft is free but to slip when the shaft is held, a type wheel on said shaft having type characters in relief on its periphery, means cooperating with a said type character in a predetermined position to print such character, a stop arm fixed on said shaft, a plurality of slidably mounted stop pins annularly disposed around said shaft to be individually movable into the path of said arm to stop said type wheel with a character on said wheel corresponding to such pin in printing position, a spring connected to each pin tending to move the pin into the path of said arm, each said pin having a latching shoulder and the end of the pin remote from said wheel being turned to lie radially with respect to the annulus defined by said pins, a latch pivoted intermediate its ends having a hook to engage said latching shoulder and a laterally extending arm having a bifurcated end, an electromagnet associated with each pin, an armature for said electromagnet pivoted at one end and having its other end disposed between the bifurcations of the arm of said latch whereby the triggering action of transitory energization of said electromagnet disengages the latch and frees the pin to be moved by the spring connected thereto, a sleeve slidable on said shaft having a radial flange engageable with the radially turned end of an unlatched pin, means actuated after the printing of a character to slide said sleeve and retract into latched position the pin then in the path of the stop arm, and means connecting each said electromagnet to a said circuit closing device.

12. In a cryptographic machine having a plurality of character keys and a circuit closing device disposed to be closed by operation of a corresponding key: printing mechanism including a rotatable print wheel having type characters corresponding to the characters on said keys in relief on its periphery, means to stop said wheel including a stop element corresponding to each said character on said wheel movable into operative position to arrest said wheel with the character corresponding to such element in printing position, a latch engageable with each said element to hold the element in inoperative position, an electromagnet individual to each latch having a movable armature connected trigger-wise to the latch, means electrically connecting each electromagnet to a respective said circuit closing device to energize the magnet when a key is depressed to disengage the latch and permit the element connected thereto to move into operative position to stop the wheel with the character corresponding to the energized magnet in printing position, means to print the character that is in printing position, and means to move the said element back into inoperative position to be engaged by the respective latch.

13. A printing unit, comprising a rotatable print wheel having on its periphery the characters to be printed, means including a stop pin individual to each character projectible to arrest said wheel in position to print the character corresponding to such pin, continuously acting means to project each pin when the pin is free to move, a pawl to retain each pin cocked in retracted position, a respective electromagnet adjacent each pin having an armature that is moved when the magnet is energized, a trigger action connection between each armature and a said pawl to release the pin held by such pawl when the armature is moved, and means to restore any said pin to retracted cocked position after the corresponding character has been printed.

* * * * *